A. TRUCHOT.
MILKING MACHINE.
APPLICATION FILED APR. 3, 1914.
1,132,639.
Patented Mar. 23, 1915.
2 SHEETS—SHEET 1.
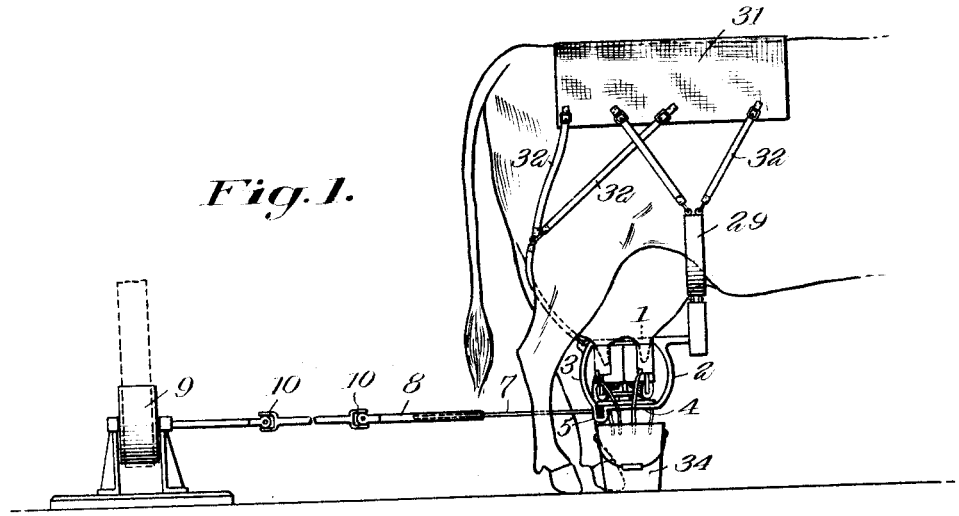
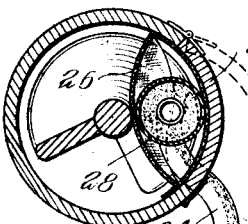
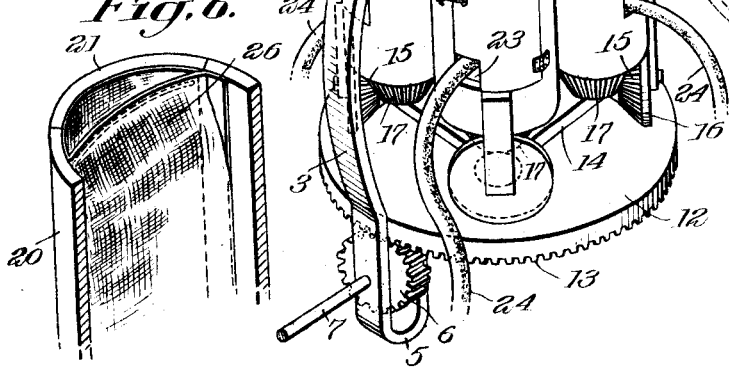
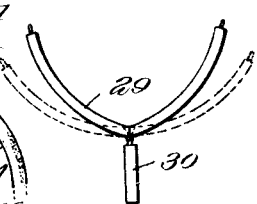
WITNESSES
INVENTOR
Alexander Truchot
BY
ATTORNEYS A. TRUCHOT.
MILKING MACHINE.
APPLICATION FILED APR. 3, 1914.
1,132,639.
Patented Mar. 23, 1915.
2 SHEETS—SHEET 2.
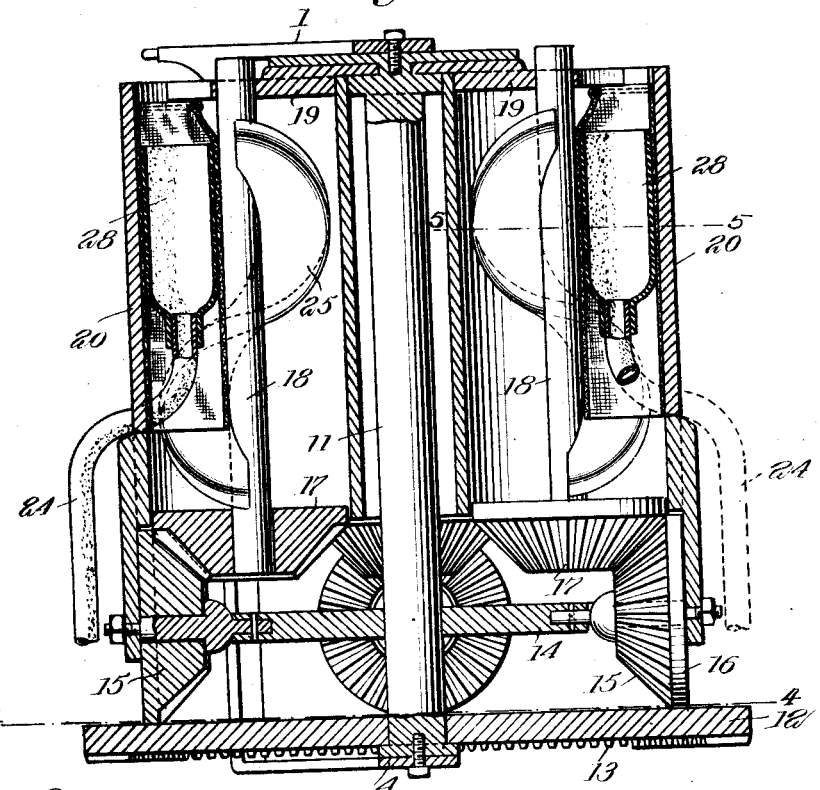
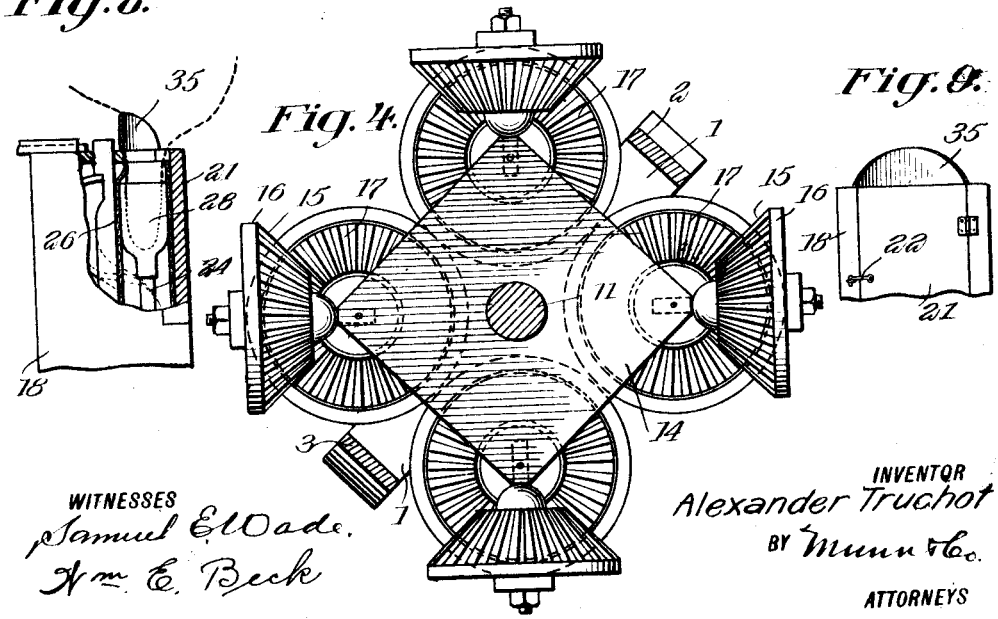
WITNESSES
Samuel E. Wade.
Wm. E. Beck
INVENTOR
Alexander Truchot
BY Munn & Co.
ATTORNEYS

UNITED STATES PATENT OFFICE.

ALEXANDER TRUCHOT, OF CHOTEAU, MONTANA.

MILKING-MACHINE.

1,132,639.  Specification of Letters Patent.  Patented Mar. 23, 1915.

Application filed April 3, 1914. Serial No. 829,243.

*To all whom it may concern:*

Be it known that I, ALEXANDER TRUCHOT, a citizen of the United States, and a resident of Choteau, in the county of Teton and State of Montana, have made certain new and useful Improvements in Milking-Machines, of which the following is a specification.

My invention relates to improvements in milking machines and it consists in the combinations, constructions, and arrangements herein described and claimed.

An object of my invention is to provide a device by means of which the milking of a cow may be accomplished rapidly and economically and with no danger of injuring the animal.

A further object of my invention is to provide a novel form of milking machine in which the apparatus is of simple construction and light weight, and is adjustable so as to permit the movement of the animal during the milking operation.

A further object of my invention is to provide a milking machine in which the milking operation closely simulates that of manual operation. This I accomplish by means of a novel form of device having certain characteristic features as hereinafter described.

Other objects and advantages will appear in the following specification and the novel features of the device will be particularly pointed out in the appended claims.

My invention is illustrated in the accompanying drawings forming part of this application in which—

Figure 1 is a side view of the device in operation, Fig. 2 is a perspective detail view of the cylinders which form part of the apparatus, Fig. 3 is a sectional view through the major portion of the device, Fig. 4, is a section along the line 4—4 of Fig. 3, looking in the direction of the arrows, Fig. 5 is a section along the line 5—5 of Fig. 3, Fig. 6 is a perspective view partly in section of one of the cylinder linings, Fig. 7 is a view of an adjustable holding member for securing the milking machine in position, Fig. 8 is a view partly in section of a modified form of the device, and Fig. 9 is a face view of a portion of the parts shown in Fig. 8.

In carrying out my invention I provide a frame portion consisting of an upper strip 1 (see Fig. 2) having downwardly extending side members 2 and 3 respectively and a bottom member 4. The frame contains a looped portion 5 (see Figs. 1 and 2) in which is journaled a driving gear 6, the shaft 7 of the driving gear forming one of a pair of telescopic members, the other portion of the shaft 8 being connected to a drive pulley 9 through the medium of two universal joints 10.

The bottom member 4 forms a support for a central post 11, which extends upwardly, and which is secured to the frame member 1. Rotatably mounted upon the central post 11 is a friction wheel 12, which is provided with gear teeth 13 arranged to mesh with the driving gear or pinion 6. A plate 14 is rigidly mounted on the central support 11 and at its ends are journaled beveled gears 15 having friction surfaces 16 arranged to engage the friction wheel 12. The beveled gears 15 in turn engage beveled gears such as those shown at 17, these latter gears being secured on individual shafts 18 which are journaled at their upper ends in a cover plate 19. This cover plate is designed to extend over the tops of a plurality of cylinders 20 which are concentric with the shafts 18. Ordinarily there are four of these cylinders. A description of one will suffice since they are all alike. The cylinders may be made of any suitable material and are hollow, as shown. Each is provided on its outer side, *i. e.*, that part away from the other cylinders with a hinged door 21 which may be locked to the main body portion by a hook 22 or any other suitable locking means. One corner of this door is preferably cut away, as shown at 23 to permit the passage of a flexible tube 24, when the door is closed. Each of the shafts is provided with a spiral flange 25 made like an auger blade except, of course, that the flange has no sharp corners, but is rounded in such a manner that its action, as hereinafter explained will not be injurious.

As well be seen from Figs. 5 and 6 there is a resilient or flexible member 26, which virtually forms a partition between the main body portion of the cylinder and that part immediately adjacent to the door 21. This flexible or resilient lining it will be observed extends in close contact and is secured to the inner side of the door.

The plate 19, as shown in Figs. 2 and 3, is cut away at 27 for the purpose of admitting the teats of the cow. Each of the cylinders 18 is designed to contain a teat-cup 28 which is made of resilient material such as rubber or the like and which communicates with the tube 24.

The milking machine is provided with a hinged support 29, the lower end of which is provided with an extension 30 to which is attached the frame member 1, as shown in Fig. 1. The member 29 is designed to encircle the under portion of the body of the cow and may be opened up to accommodate animals of various sizes.

Any suitable means may be used to support the milking machine, but I prefer to make use of the device set forth in Fig. 1. This consists of a resilient member such as a piece of blanket 31 arranged to go over the back of the cow and having straps 32 some of which are secured to the member 29, the others being passed rearwardly and downwardly and being secured to an ear 33 on the frame.

From the foregoing description of the various parts of the device the operation thereof may be readily understood.

In securing the machine to the animal the doors 21 are opened, the teat-cups are placed over the teats of the cow and the doors are closed in such a manner that the teats project through the openings 27. The doors 21 are now locked in position. Power is applied to the motor 9 and the friction disk 12 is caused to revolve through the medium of the shaft 7, gear 6 and gear 13. This will cause the revolution of the friction wheels 16 and the turning of the shafts 18 through the medium of the beveled gears 15 and 17. These shafts 18 are turned in such a direction that the spiral flanges will press against the resilient partitions 26, thus squeezing the teat between the spiral flange and the door 21. As the spiral blade revolves the point of engagement of the blade with the teat will move downwardly toward the end of the teat, thereby simulating the manual operation of milking. The milk will be forced out of the teat-cup and through the tube 24 into the receptacle 34.

It often happens that a cow in being milked will move rearwardly and in order to permit this movement without interfering with the operation of the device I provide the telescopic shaft members 7 and 8. The universal joints in the shaft 8 are for the purpose of permitting an inclination of the shaft in various directions. It may happen that the hind teats of the cow are shorter than the front, or vice versa, and in either case the machine must be tilted. The provision of the universal joints permits the tilting of the machine without interfering with its operation.

The particular purpose of the partition 26 is to prevent any injury to the animal by the spiral blade since there is no possibility of the teat being torn by the spiral blade as it only contacts with the flexible partition.

In Figs. 8 and 9 I have shown a modification of the device in which there is an ear-like extension 35 above each cylinder which is arranged to fit up close to the udder. The purpose of these ears is to press the udders at all times while the milking is going on, in order to help hold the teats in the same position as they were in when the udders were full of milk.

A device constructed in accordance with this invention forms a simple yet effective means of mechanical milking. The revolving spiral flanges, as has been before stated, simulate the manual operation of milking as nearly as possible.

The device can be easily detached and being light of weight can be transported.

I claim:

1. In a milking machine, a receptacle having a door provided with an opening in its bottom, means for locking the door, said receptacle having an opening in its top for admitting a teat of the animal, a teat cup, a resilient tube connected therewith at the bottom, said tube passing through the opening of the door, a resilient partition within said casing, a central shaft, a spiral blade disposed upon said central shaft, and means for turning said central shaft.

2. In a milking machine, a receptacle having a door provided with an opening in its bottom, means for locking the door, said receptacle having an opening in its top for admitting the teat of the animal, a teat-cup, a resilient tube connected therewith at the bottom, said tube passing through the opening of the door, a resilient partition within said casing, a central shaft, a spiral blade disposed upon said central shaft, means for turning said central shaft, said spiral blade being arranged to engage said resilient partition initially at the top thereof and to exert pressure progressively downward as the blade is turned, thereby pressing the teat and the teat-cup against the door.

3. In a milking machine, a plurality of cylinders, each having a hinged door, means for locking the door, each of said cylinders being provided with an opening in its top for admitting the teat of the animal, a teat-cup, a resilient partition disposed within each cylinder, a central shaft, a spiral blade carried by said central shaft and arranged to engage said resilient partition, and means for simultaneously turning the shafts of each of said cylinders in the same direction.

4. In a milking machine, a plurality of cylinders, each having a hinged door, means for locking the door, each of said cylinders being provided with an opening in its top for admitting the teat of the animal, a teat-cup, a resilient partition disposed within each cylinder, a central shaft, a spiral blade carried by said central shaft and arranged to engage said resilient partition, means for simultaneously turning the shafts of each of said cylinders in the same direction, said last named means comprising beveled gears carried at the bottom of each of said shafts, an individual driving gear arranged to mesh with each of said first named beveled gears, and a friction disk in engagement with the edges of each of said driving gears.

5. In a milking machine, a plurality of cylinders, each having a hinged door, means for locking the door, each of said cylinders being provided with an opening in its top for admitting the teat of the animal, a teat-cup, a resilient partition disposed within each cylinder, a central shaft, a spiral blade carried by said central shaft and arranged to engage said resilient partition, means for simultaneously turning the shafts of each of said cylinders in the same direction, said last named means comprising beveled gears carried at the bottom of each of said shafts, an individual driving gear arranged to mesh with each of said first named beveled gears, a friction disk in engagement with the edges of each of said driving gears, means for driving said friction disk, said means comprising a drive shaft having universal joints, a portion of said drive shaft being telescopic, and means connected with said drive shaft for imparting the movement of the shaft to said friction disk.

ALEXANDER TRUCHOT.

Witnesses:
J. G. BAIR,
VIOLA ELLSTROM.

Copies of this patent may be obtained for five cents each, by addressing the "Commissioner of Patents, Washington, D. C."